United States Patent Office 3,473,905
Patented Oct. 21, 1969

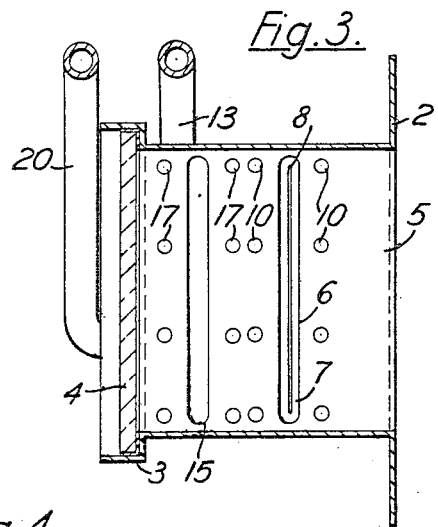
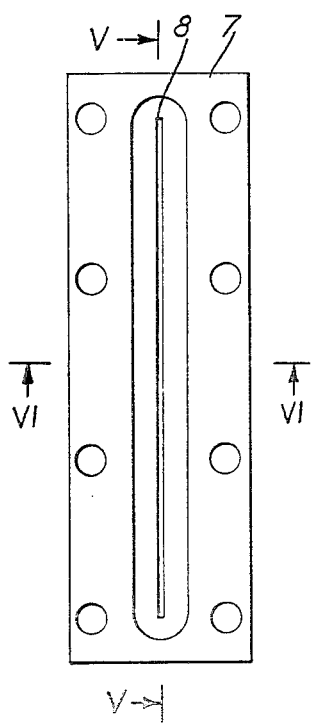
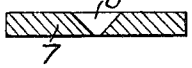

3,473,905
METHOD AND APPARATUS FOR PROVIDING A GAS CURTAIN OVER A GLASS FURNACE WINDOW
John J. Jago, Liverpool, and Deryck T. Roberts, Leigh, England, assignors to Pilkington Brothers Limited, Liverpool, Lancashire, England, a corporation of Great Britain
Filed May 2, 1966, Ser. No. 546,724
Claims priority, application Great Britain, May 15, 1965, 20,540/65
Int. Cl. C03b 5/16
U.S. Cl. 65—27                                    8 Claims

ABSTRACT OF THE DISCLOSURE

A viewing structure for attachment to a wall of a furnace comprises a viewing box with a window at its outer end, and gas supply means for forming a protective curtain of gas across the inside of the box spaced from the window, and for supplying gas under pressure into the space between the window and the curtain.

---

Figure 1:
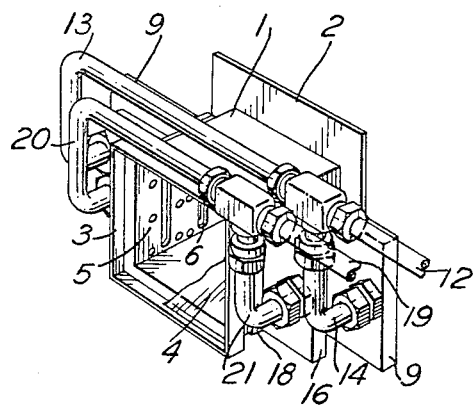

This invention relates to a viewing structure for attachment to a wall of glass manufacturing apparatus.

Many industrial processes, such as the melting of glass or the production of glass in ribbon form during which glass is supported upon a bath of molten metal, take place in a closed apparatus and windows may be provided in the walls of the apparatus through which the process can be observed by an operator or by means of a camera.

However, in such processes the atmosphere within the chamber is often harmful to the windows in that the atmosphere may contain components which will condense or be otherwise deposited on the inner face of the window and thereby render the window opaque within a short period of time (for example within as short a time as five minutes). It is therefore necessary to replace the windows at frequent intervals in order for the operator or the camera to be able to observe the process continually.

Furthermore, the temperature of such processes are frequently high, for example greater than 1000° C. and then the material of the new windows being installed is subject to a sudden rise in temperature as it is placed in position so that cracking and crazing of the new window frequently occurs during its installation.

It is a main object of the present invention to provide a viewing structure for attachment to a wall of glass manufacturing apparatus which is not subject to these disabilities.

A viewing structure for attachment to a wall of glass manufacturing apparatus, constructed in accordance with the present invention, comprises a box adapted for fixing over an aperture in a wall, a window sealing off the outer end of the box, and gas supply means connected to the box and including means for maintaining a curtain of gas across the interior of the box at a distance from the window to isolate the window from the atmosphere in the glass manufacturing apparatus.

Preferably the gas supply means includes members defining two oppositely disposed slots at opposite sides of the box, the slots being formed so as to project said curtain of gas across the interior of the box.

In the preferred embodiment of the invention the gas supply means further includes connections to the box between the slots and the window for supplying gas into the space between the curtain of gas and the window so as to produce a pressure in that space at least as great as the pressure of the atmosphere in the glass manufacturing apparatus.

Further, in the preferred embodiment of the invention, opposite sides of the box are formed with elongated and oppositely disposed openings, which openings are parallel to the window and two plates formed with slot shaped orifices are respectively secured over the openings.

Preferably each of the slot shaped orifices has a tapering cross section which tapers away from the inside of the box.

Desirably the gas supply means includes two expansion chambers respectively fitted to the slotted plates and being connected to a gas supply pipe, whereby the slots constitute outlets for gas from the expansion chambers.

In the preferred embodiment of the invention, the walls of the box are formed with oppositely disposed apertures between the slots and the window and additional expansion chambers are connected to the walls of the box over said apertures, both the additional expansion chambers being connected to a gas supply pipe.

The present invention also comprehends glass manufacturing apparatus including a tank structure holding a bath of molten metal and having at least one viewing structure constructed according to the present invention fixed over an aperture in a side wall of the tank structure above the level of the surface of the molten metal bath.

The present invention comprises in particular, a glass melting furnace including a viewing structure constructed in accordance with the present invention fixed over an aperture in a wall of the furnace above the level of the molten glass in the furnace.

According to another aspect of the present invention, there is provided a method of protecting a viewing window in glass manufacturing apparatus from the atmosphere in a headspace in the apparatus, comprising defining an enclosure between the window and the headspace and directing a curtain of gas across the enclosure near the window to isolate the window from the atmosphere in the headspace while supplying gas into the enclosure between the curtain of gas and the window at a pressure at least as great as the pressure in the headspace.

Figure 2:
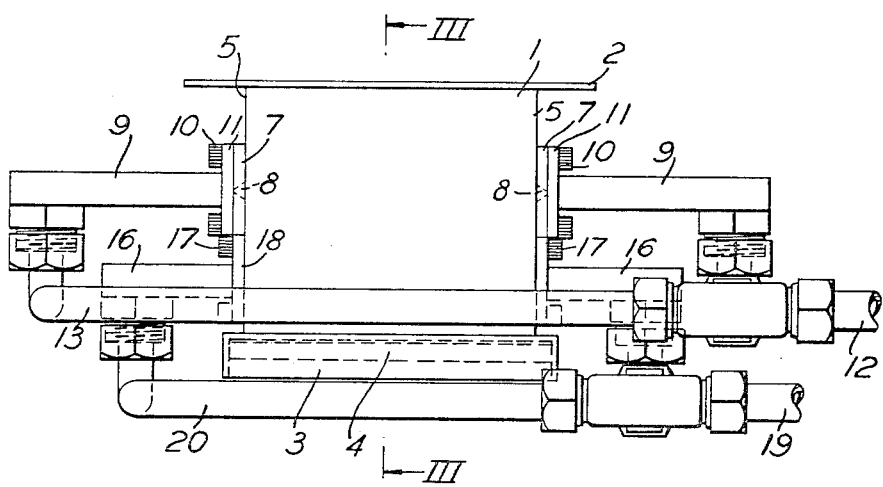

In order that the invention may be more clearly understood, the preferred embodiment thereof will now be described, by way of example, by reference to the accompanying diagrammatic drawings, in which:

FIGURE 1 shows a perspective view of a viewing structure for attachment to a wall of glass manufacturing apparatus, constructed in accordance with the present invention, FIGURE 2 shows a plan view of the viewing structure of FIGURE 1, FIGURE 3 shows a cross-section taken on the line III—III in FIGURE 2, FIGURE 4 shows a plan view of a plate formed with a slot shaped orifice, the plate being part of the viewing structure shown in FIGURES 1 to 3, FIGURE 5 shows a cross-sectional view on the line V—V through the plate shown in FIGURE 4, and FIGURE 6 shows a cross-sectional view on the line VI—VI through the plate shown in FIGURE 4.

The viewing structure shown in FIGURES 1 to 3 of the drawings comprises a rectangular box 1 which at one end is provided with a flat flange 2 by means of which the box 1 can be attached to a wall of a glass manufacturing apparatus by means of bolts passed through the flange 2 and into the wall. The glass manufacturing apparatus to the wall of which the viewing structure is attached may be, for example, of the kind which includes a tank structure holding a bath of molten metal, and in that case the viewing structure is fixed over an aperture in a side wall of the tank structure above the level of the surface of the molten metal bath. If the glass manufacturing apparatus is a glass melting furnace, the viewing structure is fixed over an aperture in a wall of the furnace above the level of the molten glass in the furnace.

The outer end of the box 1 is provided with a peripheral angled flange 3 and is sealed off by a window 4 of glass which is fixed in the peripheral flange with a sealing compound.

The box 1 thus defines an enclosure between the window and the headspace of the glass manufacturing apparatus.

Referring to FIGURES 2 and 3 it will be seen that opposite side walls 5 of the box 1 are formed with elongated and oppositely disposed openings 6, which openings are parallel to the window 4. Two plates, 7, each formed with a slot shaped orifice 8 therein, are secured over respective openings 6.

The form of the slot shaped orifices 8 is illustrated in FIGURES 4, 5 and 6 where it will be seen that each of the orifices has a tapering cross-section, and the plates 7 are secured over the openings 6 with the slots tapering away from the inside of the box 1, as shown in FIGURE 2.

The viewing structure includes gas supply means comprising two expansion chambers 9 secured over the respective slotted plates 7 by means of bolts 10 which pass through mounting flanges 11 of the expansion chambers 9 and through the slotted plates 7 to be screwed into the side walls 5 of the box 1.

A gas supply pipe 12, which is connected to a source of suitable gas under pressure, for example nitrogen, is connected by two branches 13 and 14 to respective ones of the two expansion chambers 9, and thus the slot shaped orifices 8 constitute outlets for gas from the expansion chambers 9.

By this arrangement when gas such as nitrogen is supplied under pressure through the pipe 12 and through the respective branches 13 and 14 of the pipe 12 to the expansion chambers 9, the tapering form of the slots 8 projects opposed flows of gas from the slots 8 towards each other in the form of a curtain of gas across the box 1 in the plane of the two slots 8.

Thus a curtain of gas is maintained across the box 1 near the window 4 to isolate the window 4 from the atmosphere existing in the glass manufacturing apparatus to which the viewing structure is attached. Any portion of the harmful atmosphere, which would in the absence of the curtain of gas come into contact with the window 4, is entrained by one of the flows of gas which form the curtain and is discharged from the open end of the box 1 since there is a continual flow of gas from the curtain out of the front of the box 1.

Referring particularly to FIGURE 3 of the drawings, the gas supply means further includes connections to the box 1 between the slots 8 and the window 4, including two vertical apertures 15 oppositely disposed in the side walls 5 of the box 1, the apertures 15 being situated between the slots 8 and the window 4.

Two additional expansion chambers 16 are connected to the walls 5 of the box 1 over the apertures 15 by means of bolts 17 which pass through mounting flanges 18 of the expansion chambers 16 and are screwed into the side walls 5 of the box 1 to secure the expansion chambers 16 thereto.

A second gas supply pipe 19 connected to a source of gas such as nitrogen under pressure is connected by branches 20 and 21 to respective ones of the expansion chambers 16.

Gas is supplied through the pipe 19 and the branches 20 and 21 to the expansion chambers 16 and emerges from the expansion chambers 16 through the vertical apertures 15 in the side walls 5 of the box into the space between the curtain of gas and the window 4 so as to produce a pressure in that space at least as great as the pressure of the atmosphere in the glass manufacturing apparatus to which the viewing structure is fitted.

When a viewing structure as described is intended for use in the wall of an apparatus in which a process is carried out at a high temperature, for example in the wall of a glass melting tank or other apparatus containing molten glass, it is advantageous to supply the gas to the slots 8 and to the apertures 15 at such a temperature (for example at the ambient temperature outside the apparatus) that the window 4 does not become overheated and a large temperature gradient across the window 4, which would otherwise exist, and which may cause cracking of the window, is avoided.

In an experimental installation a viewing structure of the kind described herein, when situated 15 feet from molten glass emerging from a glass melting furnace and supplied with gas at a rate of 80 cubic feet per hour to the slots 8 and 50 cubic feet per hour to the space between the window 4 and the slots 8, has shown no sign of obscuration after a period of 100 hours.

It will be appreciated that by using a viewing structure constructed in accordance with the present invention, in proximity to the atmosphere in the headspace of a glass manufacturing apparatus, material in that atmosphere which would have condensed or otherwise have been deposited on the inner surface of the window 4, is kept away from the window 4 by the curtain of gas maintained between the slots 8.

Further the possibility of a pressure rise in the headspace deflecting the curtain of gas into contact with the window 4 is avoided by producing between the curtain of gas and the window a pressure at least equal to the pressure in the headspace.

Moreover the possibility of the window 4 cracking or crazing under a high temperature which may exist in the headspace of the apparatus to which the viewing structure is fitted is also minimised by supplying the gas to the curtain, and between the curtain and the window 4, at a temperature equal to the ambient temperature outside the apparatus.

We claim:

1. A structure for viewing through the wall of glass manufacturing apparatus comprising a box having an outer end sealed off by a window and an inner end communicating with the headspace in said apparatus, side walls for said box formed with oppositely disposed elongated gas release openings located at a distance from said window and in position to release a curtain of gas which passes through said openings to isolate said window from atmosphere in said head space, additional gas release aperture means communicating with the interior of said box between said curtain of gas and said window, means connected to said elongated openings for causing gas to be released therethrough under control to establish and maintain said curtain, and means for supplying gas to said additional gas release apertures under different control to produce in the space between the curtain of gas and the window a pressure at least equal to the pressure in the head space whereby there is a continual flow of curtain gas through the inner end of said box to the head space.

2. For protecting a viewing window which seals the outer end of an enclosure extending through the wall of glass manufacturing apparatus and opening at its inner end to provide visual observation of head space in the apparatus, the method which comprises forming a gas curtain by directing gas from opposite sides of said enclosure at positions spaced equidistantly from the window and with velocity sufficient to establish and maintain said curtain completely across said enclosure, and supplying gas to the enclosure in the space between the established curtain of gas and the window at a pressure at least as great as the pressure of the atmosphere in the head space whereby gas from the curtain flows through said opening at the inner end and into the head space effectively to isolate the window from the atmosphere therein.

3. A structure according to claim 1, wherein said oppositely disposed elongated gas release openings are parallel to the window and comprise two plates formed with slot shaped orifices.

4. A structure according to claim 3, wherein each of the slot shaped orifices has a tapering cross-section which tapers away from the inside of the box.

5. A structure according to claim 3, wherein the gas supply means includes two expansion chambers respectively fixed to the slotted plates and being connected to a gas supply pipe, whereby the slots constitute outlets for gas from the expansion chambers.

6. A structure according to claim 5, wherein additional expansion chambers are connected to the walls of the box over said additional apertures, both the additional expansion chambers being connected to a gas supply pipe.

7. Glass manufacturing apparatus including a tank structure holding a bath of molten metal and having at least one viewing structure according to claim 1, fixed over an aperture in a side wall of the tank structure above the level of the surface of the molten metal bath.

8. A glass melting furnace including a viewing structure according to claim 1, fixed over an aperture in a wall of the furnace above the level of the molten glass in the furnace.

References Cited

UNITED STATES PATENTS

| | | | |
|---|---|---|---|
| 2,896,854 | 7/1959 | Noble et al. | 98—36 X |
| 3,301,162 | 1/1967 | Zumbiel | 98—36 |
| 3,351,451 | 11/1967 | Barradell-Smith et al. | 65—99 X |

S. LEON BASHORE, Primary Examiner

A. D. KELLOGG, Assistant Examiner

U.S. Cl. X.R.

34—242; 65—29, 157, 158; 98—36, 88